No. 874,627. PATENTED DEC. 24, 1907.
C. W. SMART.
TRANSMISSION GEAR FOR AUTOMOBILES.
APPLICATION FILED APR. 30, 1906.

2 SHEETS—SHEET 1.

ATTEST.
H. J. Fletcher.
M. T. Smith.

INVENTOR
CHARLES W. SMART.
BY Higdon Longan.
ATT'YS.

No. 874,627.
PATENTED DEC. 24, 1907.
C. W. SMART.
TRANSMISSION GEAR FOR AUTOMOBILES.
APPLICATION FILED APR. 30, 1906.
2 SHEETS—SHEET 2.
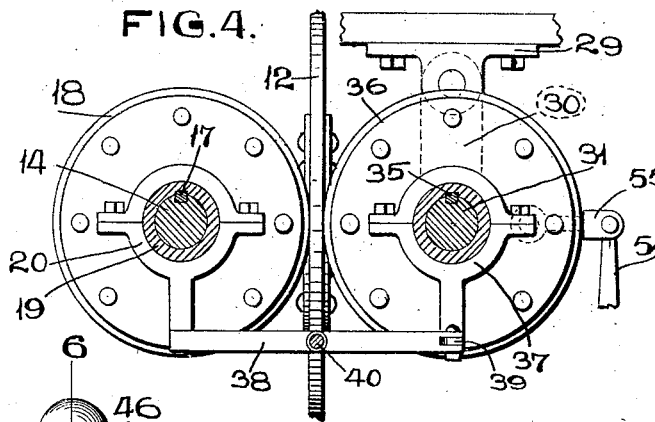
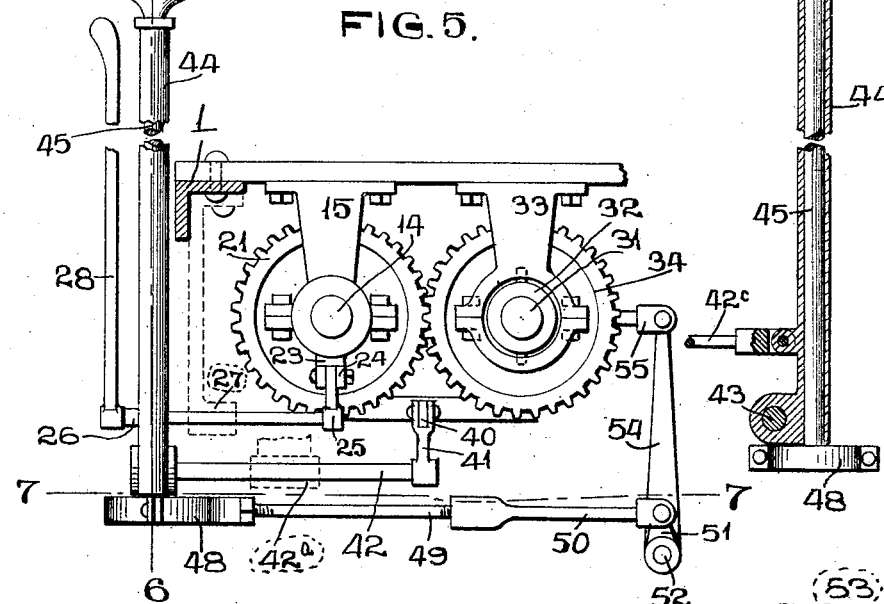
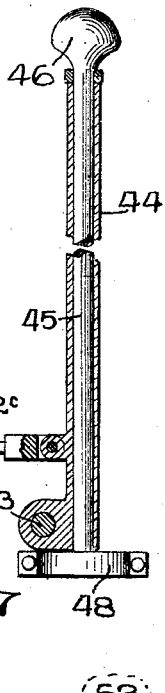
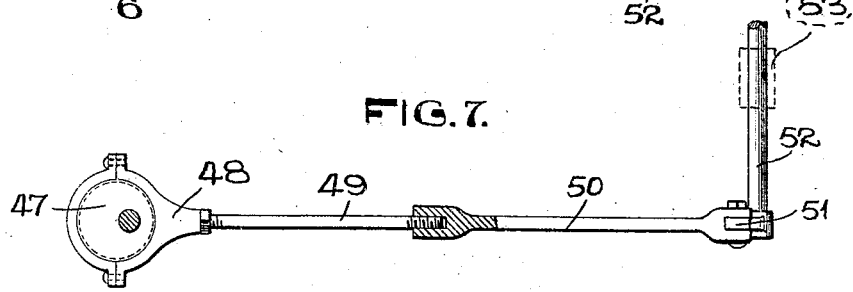
ATTEST.
H. J. Fletcher.
M. P. Smith
INVENTOR.
CHARLES W. SMART.
BY Higdon & Longan
ATT'YS.

UNITED STATES PATENT OFFICE.

CHARLES W. SMART, OF MEMPHIS, TENNESSEE.

TRANSMISSION-GEAR FOR AUTOMOBILES.

No. 874,627.  Specification of Letters Patent.  Patented Dec. 24, 1907.

Application filed April 30, 1906. Serial No. 314,576.

*To all whom it may concern:*

Be it known that I, CHARLES W. SMART, citizen of the United States, and resident of Memphis, Tennessee, have invented certain new and useful Improvements in Transmission-Gears for Automobiles, of which the following is a specification containing a full, clear, and exact description, reference being had to the accompanying drawings, forming a part hereof.

My invention relates to a transmission gear for automobiles, and the principal object of my invention is to construct a simple, inexpensive, and easily operated transmission gear particularly adapted for automobiles, and by means of which variable speed is obtained without the use of a large number of meshing gears.

A further object of my invention is to construct a transmission gear wherein friction is utilized in imparting the power of the engine to the driving axle of the automobile.

A further object of my invention is to construct a simple and easily operated handle and controlling device for shifting the friction driving wheels from one position to another on the main friction disk, and for bringing said friction wheels into and out of engagement with said main friction wheel.

To the above purposes, my invention consists of certain novel features of construction and arrangement of parts which will be hereinafter more fully set forth, pointed out in the claims, and illustrated in the accompanying drawings, in which—

Figure 1:
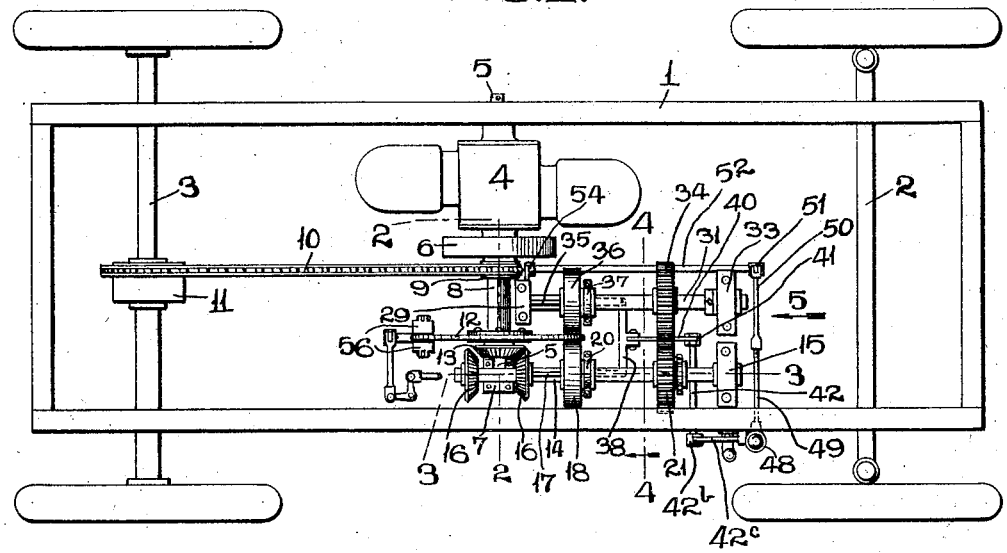
Figure 2:
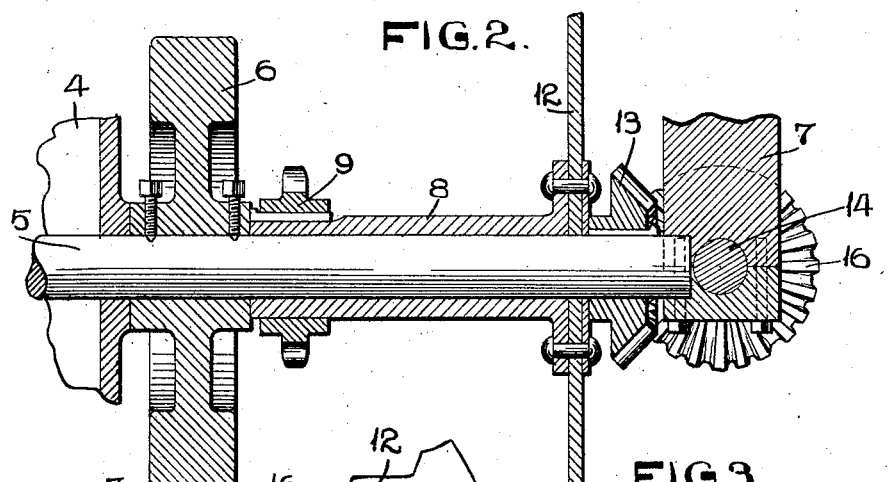
Figure 3:
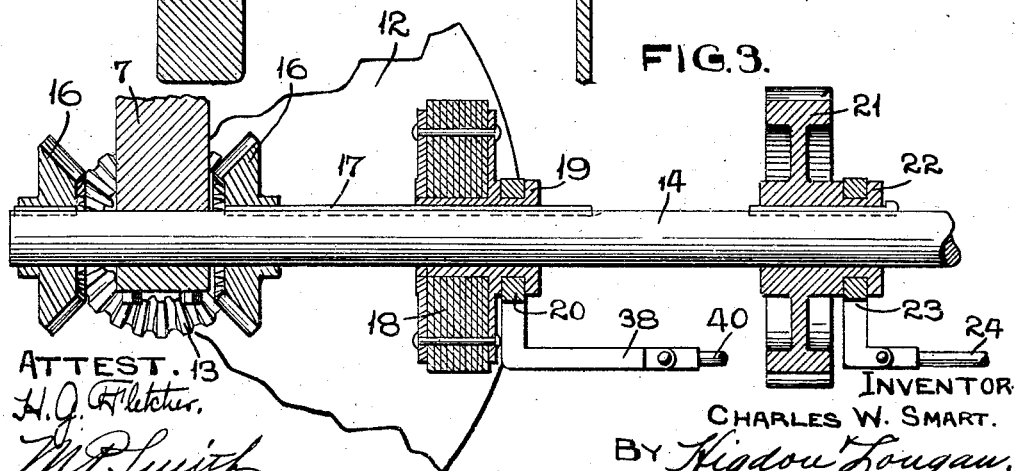

Figure 1 is a plan view of an automobile frame showing the engine and my improved transmission gear in proper position in said frame; Fig. 2 is an enlarged vertical section taken approximately on the line 2—2 of Fig. 1; Fig. 3 is a vertical section taken approximately on the line 3—3 of Fig. 1; Fig. 4 is a transverse section taken on the line 4—4 of Fig. 1; Fig. 5 is an enlarged end elevation of the transmission gear taken looking in the direction indicated by the arrow 5 in Fig. 1; Fig. 6 is a vertical section taken on the line 6—6 of Fig. 5; Fig. 7 is a plan view partly in section and taken looking downwardly on the line 7—7 of Fig. 5.

Referring by numerals to the accompanying drawings, 1 designates the automobile frame, 2 the front axle, 3 the rear axle, and 4 the engine casing.

5 designates the engine shaft which extends horizontally from one side of the engine casing 4, and upon which is fixed a suitable fly wheel 6. The outer end of the shaft 5 is journaled in a suitable hanging bracket 7, which is secured to a part of the frame 1. Loosely mounted upon the shaft 5 between the fly wheel 6 and the bracket 7 is a sleeve 8, and upon the end thereof adjacent the fly wheel 6 is a sprocket wheel 9. Passing around this sprocket wheel 9 is a chain 10, which also passes around a sprocket wheel carried by the differential gear 11 on the rear axle 3. Fixed on the end of the sleeve 8 opposite from the sprocket wheel 9 is a large friction disk 12, and rigidly fixed upon the end of the shaft 5 between the disk 12 and the bracket 7 is a beveled pinion 13.

Journaled in the bracket 7, and extending forwardly therefrom at right angles to the engine shaft 5 is a shaft 14, the forward end of which is journaled in a bearing 15, which is fixed in any suitable manner to a portion of the frame 1. This shaft 14 is adapted to be shifted longitudinally a slight distance, and fixed upon the rear end of said shaft on opposite sides of the bracket 7 are beveled pinions 16, which are adapted to alternately engage with the beveled pinion 13, depending on the rear or forward position of the shaft 14.

Arranged to slide on a key or feather 17 carried by the shaft 14 is a small friction wheel 18, which is preferably made up of a series of fiber or paper disks suitably held together, and the periphery of said friction wheel is adapted to ride upon the corresponding side face of the large friction wheel 12. This friction wheel 18 is provided with a grooved hub 19, in which is engaged a yoke 20.

Rigidly fixed upon the shaft 14 between the friction wheel 18, and the bearing 15, is a gear wheel 21, which is provided with a grooved hub 22, which is engaged by a yoke 23.

Pivotally connected to the lower end of this yoke 23 is one end of a horizontally disposed rod 24, to the opposite end of which is pivotally connected the upper end of a short lever 25, the latter being fixed on the inner end of a rock shaft 26, journaled in a suitable bracket 27, and the outer end of said rock shaft 26 extends outwardly past the side of the frame 1, and is provided with an upwardly projecting operating handle 28.

The mechanism just described provides means for shifting the shaft 14 longitudinally to bring either one of the beveled pinions 16 into engagement with the beveled pinion 13.

29 designates a bracket, which is fixed to a portion of the frame 1 immediately in front of the sleeve 8, and pivotally connected thereto is a hanging bearing 30, in which is journaled the forward end of a shaft 31, the latter being of the same diameter and extending parallel with the shaft 14. The forward end of this shaft 31 is journaled for rotation in a collar 32, which is pivotally mounted in a bearing 33, the latter being fixed to a suitable portion of the frame 1 immediately to one side of the bearing 15. Rigidly fixed on this shaft 31, and meshing with the gear wheel 21 is a similarly sized gear wheel 34.

Arranged to slide longitudinally upon a key or feather 35, carried by the rear end of the shaft 31, is a friction wheel 36, of the same size and construction as is the friction wheel 18, and the grooved hub of this friction wheel 36 is engaged by a yoke 37.

One arm of a frame 38 is rigidly fixed to the yoke 20, and the opposite arm of this frame is pivotally connected to the yoke 37, as indicated by 39. Connected to and extending forwardly from the center of the frame 38 is a rod 40, to the forward end of which is pivotally connected the upper end of a short arm 41 carried by the inner end of a rock shaft 42. This rock shaft is mounted for rotation in a suitable bearing 42$^a$ fixed to the frame 1, and the outer end of said shaft which extends beyond the frame 1 carries an upwardly projecting arm 42$^b$, and pivotally connected to the upper end thereof is the rear end of a connecting rod 42$^c$.

Journaled upon a pin 43 carried by a part of the frame 1 is the lower end of a tube 44. Arranged for rotation in this tube 44 is a rod 45, on the upper end of which is formed a suitable handle 46. Eccentrically mounted on the lower end of this rod 45 is a disk 47, around which passes a yoke 48. Connected to this yoke 48 is an inwardly extending rod 49, and screw seated on the inner end thereof is a second rod 50. The inner end of the rod 50 is pivotally connected to the upper end of a short arm 51, which is fixed on the forward end of a rock shaft 52, which latter is suitably journaled in bearings 53 carried by the frame 1, and the rear end of said rock shaft is provided with an upwardly extending arm 54, and the upper end of said arm is connected by a link 55 to the lower end of the swinging bearing 30.

If desired, a suitable brake device in the form of a pair of jaws 56 may be arranged in front of the transmission gear in such a manner as to clamp on the side faces of the friction disk 12, and which jaws may be forced together and apart by any suitable lever mechanism.

The operation is as follows: When the friction wheels 18 and 36 are drawn to their forward limit of movement, they engage upon the extreme outer edge of the side faces of the friction disk 12. When in this position, the automobile is traveling at the slowest speed, and the rotary motion of the engine shaft 5 is transmitted by the beveled pinion 13 to the beveled pinion 16 which is in engagement therewith, and thus the shaft 14 is rotated, and a corresponding motion is imparted to the shaft 31 by the engagement of the gear wheels 21 and 34. Thus, both shafts 14 and 31 rotate toward one another at the same speed, and the friction wheels 18 and 36 impinge, or frictionally engage the surfaces of the friction disk, and impart rotary motion thereto. This rotary motion drives the sprocket wheel 9, sprocket chain 10, and in turn rotates the rear axle 3, and drives the machine forward. When it is desired to move the friction disks 18 and 36 rearwardly upon the shafts 14 and 31, or toward the center of the friction disk 18 to increase the speed of the automobile, the operator engages the handle 46, on the upper end of the rod 45, and moves the same rearwardly, thus swinging the tube 44 upon the pin 43. This action moves the rod 42$^c$ rearwardly, and by so doing rocks the shaft 42 in the bearing 42$^a$, in turn moving the rod 40 rearwardly, which action moves the frame 38 rearwardly, and thus shifts the friction wheels 18 and 36 upon the shafts 14 and 31 so that they travel toward the center of the large friction wheel 12. As said friction wheels 18 and 36 now travel upon a smaller circle upon the friction disk 12 than heretofore, said friction disk and the parts connected thereto are driven at an increased rate of speed. When the operating handle is thus pulled rearwardly, the eccentric disk 47 will be tilted slightly, and the rod 49 will shift slightly at the point where it is connected with the rod 50. When it is desired to stop the automobile, or release the friction drive, the operator engages the handle 46, and by means of the same rotates the shaft 45, in turn rotating the eccentric disk 47, and thus laterally shifting the rods 49 and 50. This action rocks the shaft 52 in its bearings, and moves the upper end of the arm 54 outwardly, and by so doing swings the bearing 30 upon its pivot, thus swinging the rear end of the shaft 31 slightly to one side, which movement draws the periphery of the friction wheel 36 away from the side of the friction disk 12. The yoke 37 is pivotally connected to the frame 38 to allow this lateral shifting of the shaft 31. When it is desired to reverse the direction of travel of the automobile, the operator engages the upper end of the handle 28, and moves the same forwardly, thus rocking the shaft 26 in its bearings, and in turn pulling the yoke 23 forwardly, and the gear wheel 21 being fixed on the shaft 14 will move said shaft forwardly a slight distance, which action will disengage the forward one of the pinions 16 from the pinion 13, and cause the rear one of said pinions 16 to engage with said pinion 13. Thus the rotary motion imparted to the shaft 14, and consequently to the various parts driven thereby, is reversed, and the direction of travel of the automobile is likewise reversed. During this shifting of the shaft 14, the friction wheel 18 is held by the yoke 20, and said friction wheel slides upon the shaft 14. The gear wheels 21 and 34 are of sufficient width to remain in mesh when the shaft 14 is shifted to a reverse position. The brake jaws 56 are arranged to clamp upon the side faces of the friction disk 12, and may be so arranged as to engage thereupon with great friction so as to quickly stop the rotation of the friction disk 12, and parts carried thereby.

It will be readily understood by persons familiar with the art how my improved transmission gear can readily be applied to any machine wherein variable speed is desired.

I claim:—

1. In an apparatus of the class described, the combination with a driving shaft, of a friction disk arranged for rotation on said driving shaft, a pair of shafts mounted for rotation, one each side of the friction disk, and one of which shafts is arranged to be shifted longitudinally, and both of the shafts being driven from the driving shaft, a pair of opposed friction wheels mounted on the shafts and engaging on the side faces of the friction disk, means whereby one end of one of the shafts is moved to and from the friction disk, and means arranged upon the longitudinally moving shaft and upon the shaft carrying the friction disk for reversing the motion of said disk when the longitudinally moving shaft is shifted from one position to another.

2. In an apparatus of the class described, the combination with a driving shaft, of a friction disk arranged for rotation on said driving shaft, a pair of shafts mounted for rotation one on each side of the friction disks, which shafts are driven from the driving shaft, one of which shafts is mounted to move longitudinally, a pair of opposed friction wheels mounted on the shafts and arranged to engage the side faces of the friction disk, means whereby the friction wheels are moved longitudinally upon the shafts, means whereby one end of one of the shafts is moved to and from the friction disk, means arranged on the longitudinally moving shaft and upon the shaft carrying the friction disk for reversing the motion of the shaft carrying the friction disk when the longitudinally moving shaft is shifted, and means whereby said last mentioned shaft is shifted.

In testimony whereof, I have signed my name to this specification, in presence of two subscribing witnesses.

CHARLES W. SMART.

Witnesses:
Wm. H. Kyle,
M. W. Voorheis.